No. 819,933. PATENTED MAY 8, 1906.
C. P. E. SCHNEIDER.
REGULATION OR CONTROL OF DYNAMO ELECTRIC MACHINES OR ELECTRIC MOTORS.
APPLICATION FILED OCT. 22, 1904.

No. 819,933. PATENTED MAY 8, 1906.
C. P. E. SCHNEIDER.
REGULATION OR CONTROL OF DYNAMO ELECTRIC MACHINES OR ELECTRIC MOTORS.
APPLICATION FILED OCT. 22, 1904.

UNITED STATES PATENT OFFICE.

CHARLES PROSPER EUGÈNE SCHNEIDER, OF LE CREUSOT, FRANCE.

REGULATION OR CONTROL OF DYNAMO-ELECTRIC MACHINES OR ELECTRIC MOTORS.

No. 819,933.

Specification of Letters Patent.

Patented May 8, 1906.

Application filed October 22, 1904. Serial No. 229,605.

*To all whom it may concern:*

Be it known that I, CHARLES PROSPER EUGÈNE SCHNEIDER, of Le Creusot, Saône-et-Loire, France, have invented a new and useful Improvement Relating to the Regulation or Control of Dynamo-Electric Machines or Electric Motors, which is fully set forth in the following specification.

The present invention has for its object the accurate regulation of the voltage of dynamos and of the speed of continuous-current motors.

Generally the voltage or the speed is varied by acting upon the number of inducing ampere-turns by inserting a resistance in the inducing-circuit or by the modification of the number of convolutions. This method presents the inconvenience of rendering the armature reaction predominant in view of the magnitude of the transverse magnetic lines of force or flux. Moreover, this method does not admit of large variations. In motors the variations of speed are accentuated by interposing a resistance in the induced circuit. This method is exceedingly costly, owing to the large dimensions necessary for the resistance, and, further, the efficiency is poor in view of the large amount of power absolutely wasted. It is possible to employ a dynamo or a motor having a double winding and a double collector. This arrangement only gives two voltages and two speeds with a little variation by combination with the means already referred to. It is also rather complicated.

In order to obtain variations of voltage or of speed instead of acting upon the inducing-field by modifying the number of ampere-turns, this invention provides a novel method consisting, broadly, in modifying the reluctance of the magnetic circuit and at the same time increasing the deviation of the lines of force between the consecutive poles.

The accompanying drawings represent, by way of example, various arrangements for the application of this novel method and also furnish explanatory diagrams.

Figure 1:
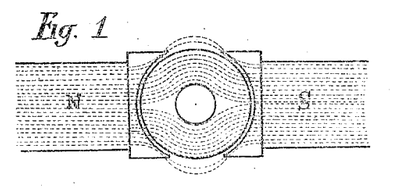
Figures 1 and 2 show diagrammatically dynamos having air-gaps of different lengths.
Figure 2:
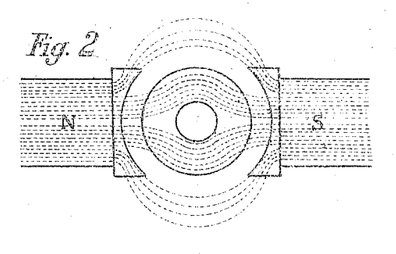

Fig. 1 shows diagrammatically a dynamo as hitherto constructed with a normal air-gap. Examination of the lines of force will at once make it apparent that almost all of them traverse the armature. In Fig. 2 the same dynamo is represented with the poles separated, the air-gap being larger and the dispersion consequently increased.

Figure 3:
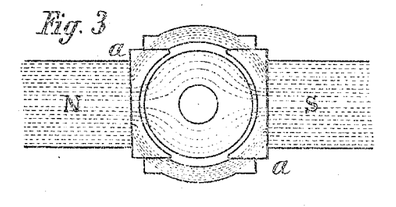
Figs. 3 and 4 show diagrammatically the deviation of the lines of flux in accordance with this invention.
Figure 4:
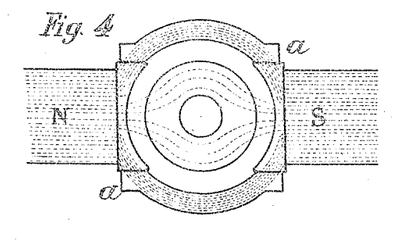

If, as shown in the diagram Fig. 3, pieces of iron $a$ are used in accordance with the said invention to unite to each other the two poles of a bipolar machine having a normal air-gap, some of the lines of force will pass through these pieces, which will insure a greater deviation of the lines of force or flux. In the diagrammatic example represented in Fig. 4 these same iron pieces $a$ are adapted to a bipolar dynamo with a large air-gap similar to that illustrated in Fig. 2. The flux having the advantage of the ready path of deviation provoked by these pieces $a$ and the greater reluctance of the air-gap is freely dispersed. In this manner there is obtained a diminution of the effective flux in the armature, and consequently a corresponding variation of the voltage in generating machines or dynamos and of the speed in motors.

Figure 5:
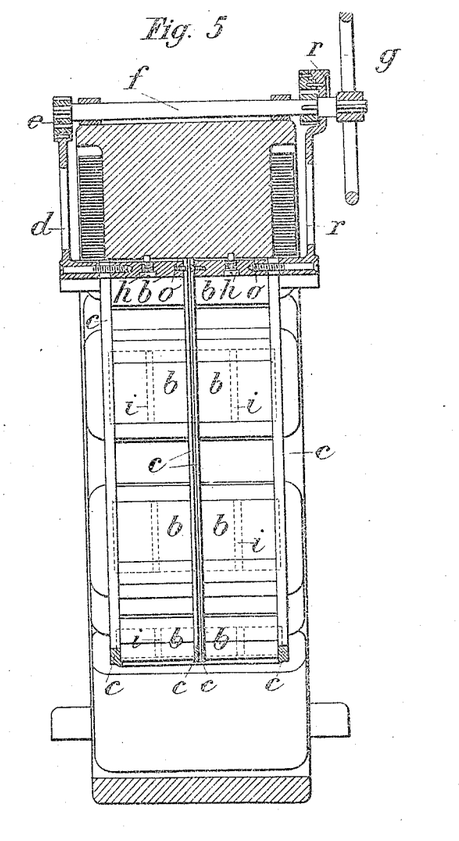
Figs. 5 and 6 illustrate the application of the principle of the invention to an eight-pole dynamo, Fig. 5 being a cross-section taken on the line A A of Fig. 6.
Figure 6:
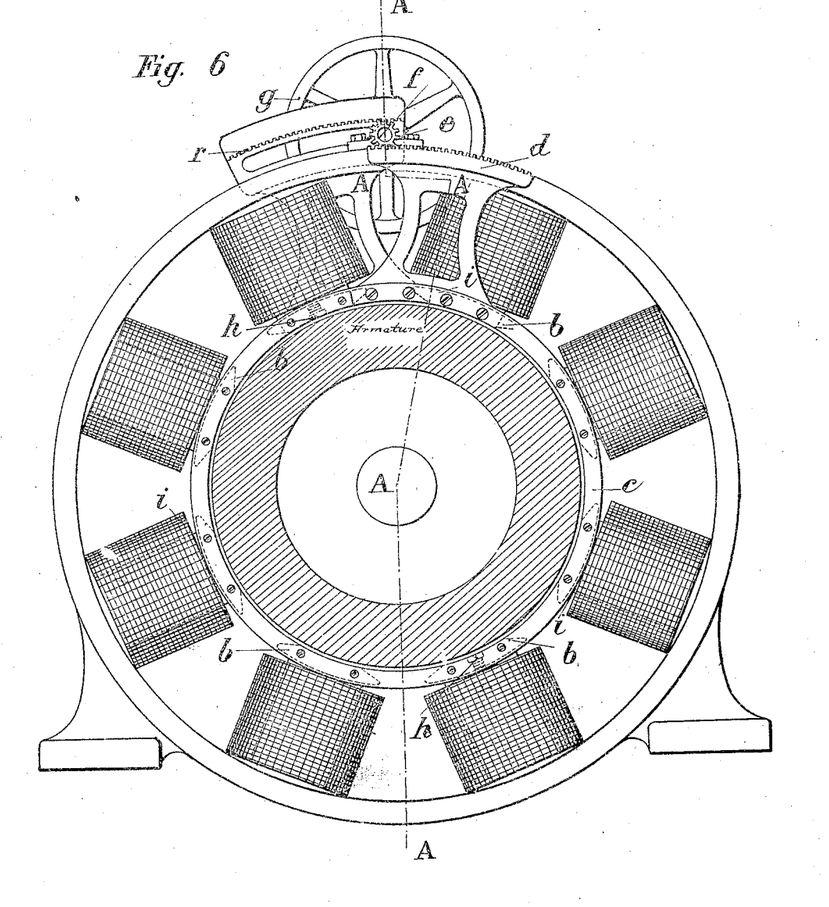

Figs. 5 and 6 illustrate the application of the aforesaid novel method to an eight-pole dynamo. The armature is represented in Fig. 6 by a cross-hatched ring. The bearings are not shown. Fig. 5 represents a section on the line A A of Fig. 6 with the armature removed. The semipolar extensions $b$ are arranged side by side in pairs beneath each magnet-pole. The adjacent polar extensions are independent, while those in each set are maintained fixed relative to each other by connecting means, such as hoops $c$, of bronze, fixed by screws upon the polar extensions $b$, connecting them up into two rings or rows, which may be caused to rotate in reverse directions by means of two toothed sectors $d$ and $r$, one toothed externally and the other internally, both being driven simultaneously by two pinions $e$ and $s$ of suitable pitch for obtaining the same angular displacement. These pinions are keyed upon the same shaft $f$, which is driven by means of the hand-wheel $g$. The aforesaid two rows of polar extensions each present in two diametrically opposite extensions headed screws $h$, guiding the latter while engaging grooves $i$, formed in the poles. In the position represented in Fig. 6 the two polar extensions of each pole are arranged one behind the other and exactly beneath the core. This is the normal position, the reluctance being then at the minimum. The inducing ampere-turns being constant, the effective flux is at the maximum, and consequently in the case of a generating-machine the voltage will be at the maximum and in the case of a motor the speed will be at the minimum.

Figure 7:
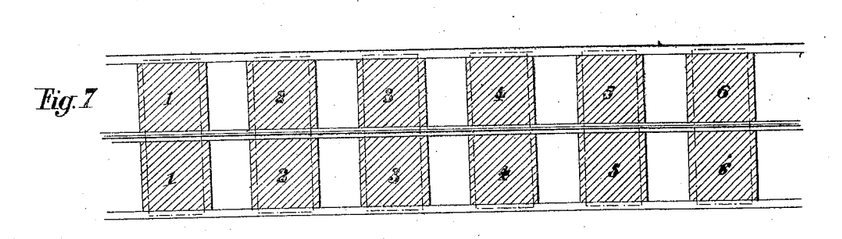
Figs. 7, 8, and 9 show diagrammatic developments of the polar extensions of a six-pole dynamo.

Fig. 7 represents in diagrammatic development the two rows of the polar extensions of a six-pole dynamo. The cross-hatched portions represent the extensions arranged in pairs opposite the poles, which are shown in dotted lines. This position corresponds to the normal position represented in Fig. 6.

Figure 8:
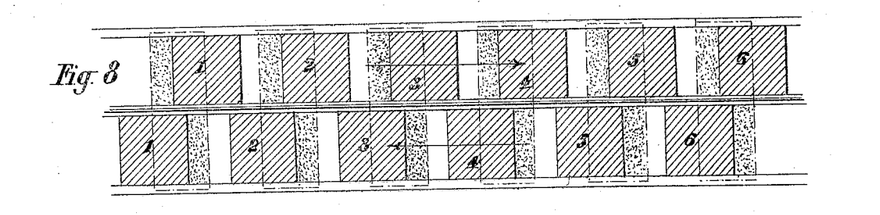

The diagram Fig. 8 shows the medium position of the extensions obtained merely by operating the hand-wheel $g$. The resulting displacement is effected by means of the pinions $e\ s$ and of the toothed sectors $d\ r$ in the direction indicated by the arrows. Moreover, the numbering of the displaced parts also gives a clear idea of the effect obtained. At this moment the reluctance is at its medium, the air-gap is increased by the whole of the part shown in dotted lines, and the voltage falls or the speed rises accordingly.

Figure 9:
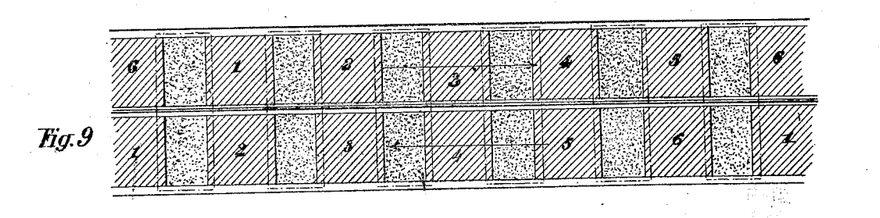

In the position represented diagrammatically in Fig. 9, the reluctance is at the maximum, the air-gap occupying the whole of the part shown in dotted lines. Moreover, (and this is a special feature of the aforesaid novel method,) the extensions magnetically connect two consecutive poles, creating a deviation between these poles, and thereby causing a large dispersion of the flux. These two effects (i. e., the increase of the reluctance and dispersion of the flux) are cumulative and produce variations in large proportions of the voltage and speed, respectively.

Figure 10:
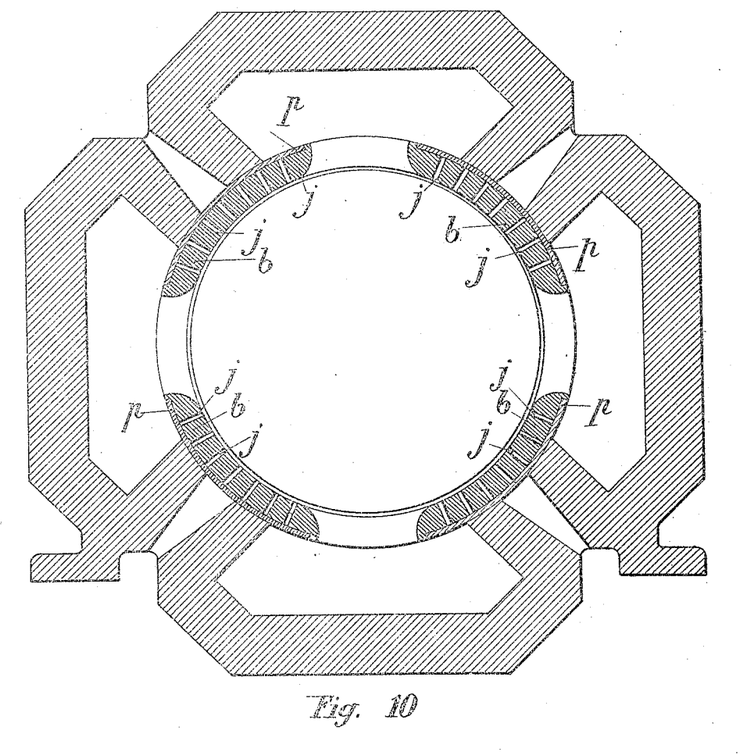
Figs. 10 and 11 are cross-sections through a four-pole dynamo, showing a modified form of polar extensions.
Figure 11:
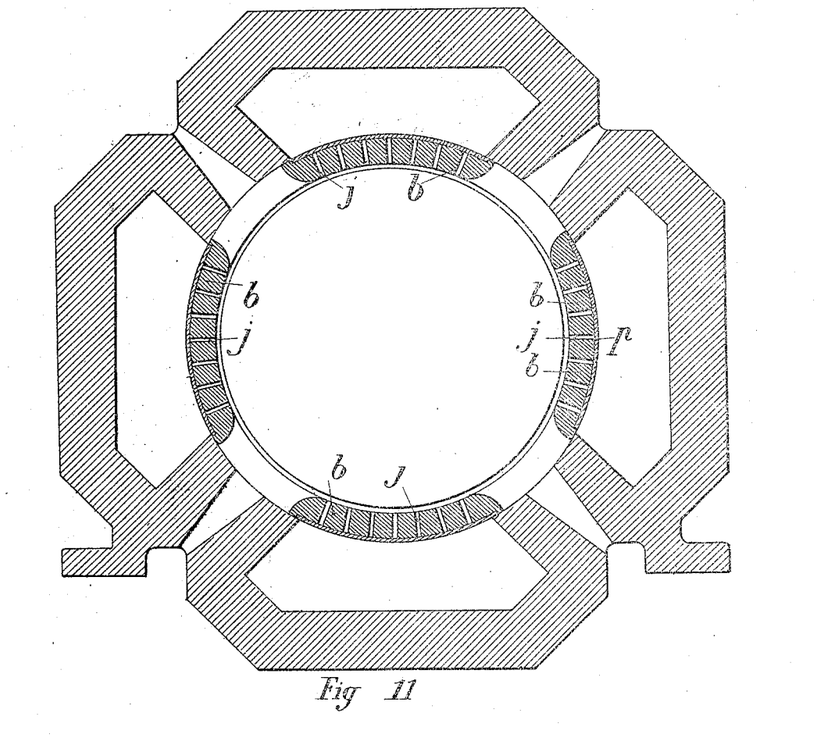
Figure 12:
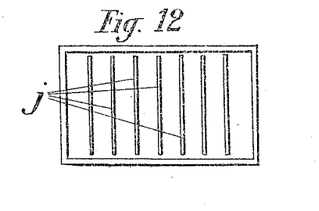
Figs. 12 and 13 show a developed plan and section of one of the extensions.
Figure 13:
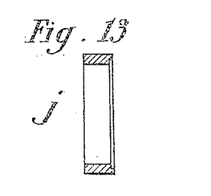

In order to obtain an improved commutation, the polar extensions $b$ may be provided with rectangular orifices $j$, as represented in Figs. 10, 11, 12, and 13. Figs. 10 and 11 are cross-sections through a four-pole dynamo. Fig. 12 is a developed plan, and Fig. 13 is a section through one of the polar extensions. The radially-arranged slots $j$ lie across the path of the transverse lines of force produced by the ampere-turns of the armature, thereby greatly increasing the reluctance of the circuit offered to them and diminishing proportionally the armature reaction due to this flux. As a consequence of thus rendering the armature reaction negligible the neutral point does not shift with varying loads. Sparkless commutation is therefore effected without shifting the brushes.

Figure 14:
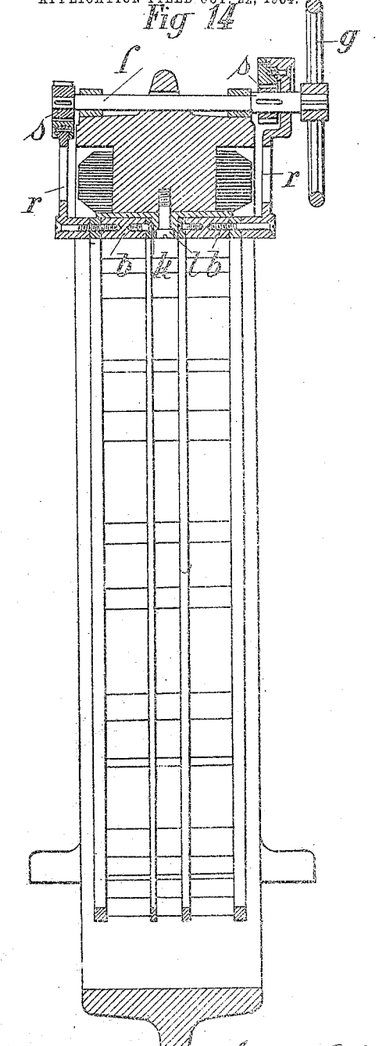
Figs. 14 and 15 illustrate in section and elevation, respectively, a dynamo with circular poles provided with my improvement.
Figure 15:
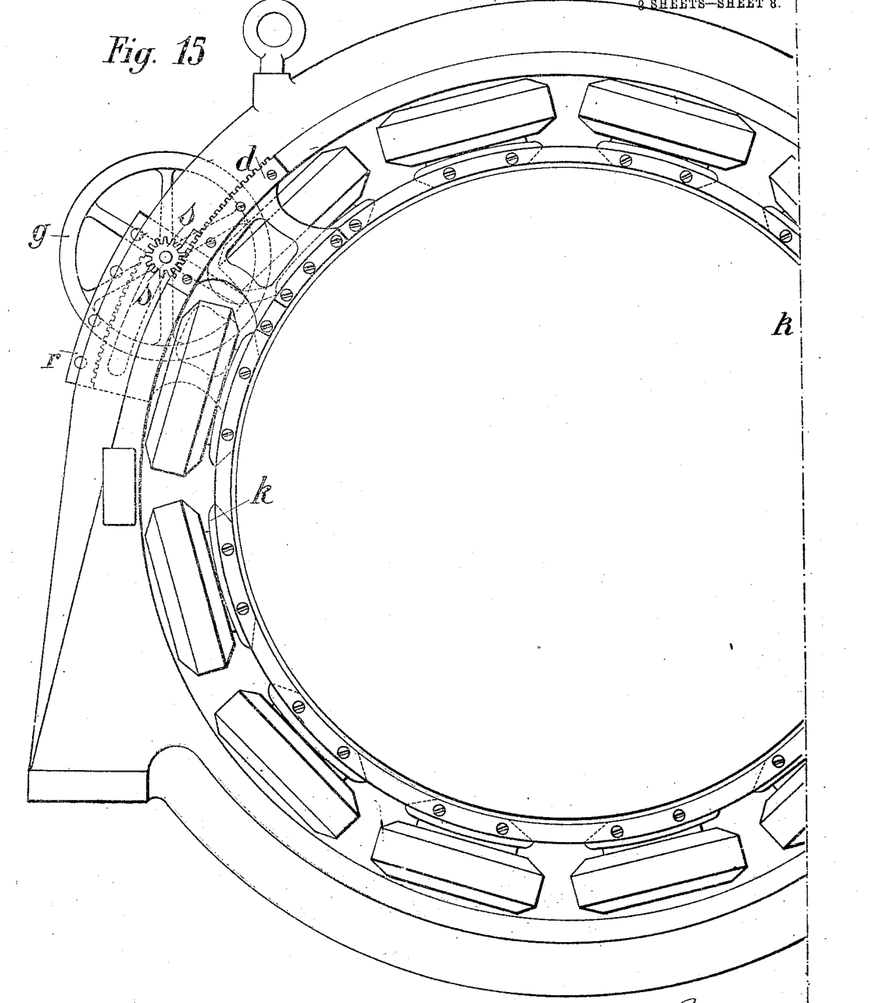

In dynamos with circular poles, such as that represented in Figs. 14 and 15 in elevation and in section, respectively, the cores are provided with fixed rectangular extensions $k$, presenting in section the form indicated in Fig. 14. In each side of the projection, serving to contain the head of the setscrew $l$, slide two rows of extensions assembled with the rings $c$, as in the example represented in Figs. 5 and 6.

From the foregoing it will be understood that this invention may be readily adapted to a dynamo of any existing type. This is a great advantage not afforded by any other known construction of dynamo capable of variable voltage or variable speed.

To facilitate the displacement of the extensions $b$, it is only necessary to leave between them and the cores a small stratum of air, preventing the adhesion caused by magnetic attraction. Fig. 5 shows the small air-space $o$ provided for this purpose. The bronze rings $c$ are the only parts in contact with the said cores. In this manner the minimum adhesion is obtained with a non-magnetic metal and at the same time a better coefficient of friction.

A modification consists in casting upon the surface in contact with the core a thin anti-friction-strip $p$, Figs. 10 and 11, of a metal which is non-magnetic and which causes very little friction.

What I claim, and desire to secure by Letters Patent of the United States, is—

1. In a dynamo or motor regulator, the combination of an armature, a plurality of field-magnet poles, a plurality of pole extension-pieces in rows intermediate said magnet-poles and armature, guide means for said extension-pieces, and a revoluble supporting-frame for each row of said pieces.

2. In a dynamo or motor regulator, the combination of an armature, a plurality of field-magnet poles each having a fixed polar extension thereon, a plurality of pole extension-pieces in two rows intermediate said polar extensions and armature, revoluble supporting-frames for said rows of extension-pieces, and means for rotating the frames in opposite directions.

3. In a dynamo or motor regulator, the combination of an armature, a plurality of magnet-poles arranged symmetrically about the same, two series of pole extension-pieces, a pair of revolubly-mounted supporting-frames one for each of said series of pieces and intermediate said armature and poles, and means for angularly displacing said frames simultaneously in opposite directions.

4. In a dynamo or motor regulator, the combination of an armature, a plurality of field-magnet poles, pole extension-pieces in rows intermediate said magnet-poles and armature, and means for angularly displacing the pieces in one row relatively to those in another.

5. In a dynamo or motor regulator, the combination of an armature, a plurality of field-magnet poles, slotted pole extension-pieces in rows intermediate said magnet-poles and armature, and means for angularly displacing the pieces in one row relatively to those in another.

6. In a dynamo or motor regulator, the combination of an armature, a plurality of field-magnet poles, slotted pole extension-pieces in rows intermediate said magnet-poles and armature, anti-adhesion means for reducing adhesion between said poles and extension-pieces, and means for angularly displacing the pieces in one row relatively to those in another.

In testimony whereof I have signed this specification in the presence of two subscribing witnesses.

CHARLES PROSPER EUGÈNE SCHNEIDER.

Witnesses:
    JEAN GAMET,
    EDMOND BLAISE.